United States Patent
Jeon et al.

(10) Patent No.: US 10,087,511 B2
(45) Date of Patent: Oct. 2, 2018

(54) METHOD FOR MANUFACTURING HIGH MANGANESE HOT-DIP GALVANIZED STEEL SHEET WITH EXCELLENT COATABILITY AND ULTRA-HIGH STRENGTH, AND HIGH MANGANESE HOT-DIP GALVANIZED STEEL SHEET MANUFACTURED BY SAID METHOD

(71) Applicant: POSCO, Pohang-Si, Gyeongsangbuk-Do (KR)

(72) Inventors: Sun-Ho Jeon, Gwangyang-si (KR); Kwang-Geun Chin, Gwangyang-si (KR); Won-Tae Cho, Gwangyang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 297 days.

(21) Appl. No.: 14/654,507

(22) PCT Filed: Dec. 19, 2013

(86) PCT No.: PCT/KR2013/011900
§ 371 (c)(1),
(2) Date: Jun. 19, 2015

(87) PCT Pub. No.: WO2014/098503
PCT Pub. Date: Jun. 26, 2014

(65) Prior Publication Data
US 2015/0329951 A1    Nov. 19, 2015

(30) Foreign Application Priority Data
Dec. 21, 2012  (KR) .................. 10-2012-0151539

(51) Int. Cl.
| | | |
|---|---|---|
| *C23C 2/02* | (2006.01) |
| *C23C 2/40* | (2006.01) |
| *B32B 15/01* | (2006.01) |
| *C23C 2/06* | (2006.01) |
| *C22C 38/00* | (2006.01) |
| *C22C 38/02* | (2006.01) |
| *C22C 38/06* | (2006.01) |
| *C22C 38/34* | (2006.01) |
| *C22C 38/50* | (2006.01) |
| *C22C 38/54* | (2006.01) |
| *C22C 38/58* | (2006.01) |
| *C21D 8/02* | (2006.01) |

(52) U.S. Cl.
CPC .............. *C23C 2/02* (2013.01); *B32B 15/013* (2013.01); *C21D 8/0278* (2013.01); *C22C 38/008* (2013.01); *C22C 38/02* (2013.01); *C22C 38/06* (2013.01); *C22C 38/34* (2013.01); *C22C 38/50* (2013.01); *C22C 38/54* (2013.01); *C22C 38/58* (2013.01); *C23C 2/06* (2013.01); *C23C 2/40* (2013.01); *C21D 8/0226* (2013.01); *C21D 8/0236* (2013.01); *Y10T 428/1266* (2015.01); *Y10T 428/12799* (2015.01)

(58) Field of Classification Search
CPC .. B32B 15/013; C21D 8/0226; C21D 8/0236; C21D 8/0278; C22C 38/008; C22C 38/02; C22C 38/06; C22C 38/34; C22C 38/50; C22C 38/54; C22C 38/58; C23C 2/02; C23C 2/06; C23C 2/70; Y10T 428/1266; Y10T 428/12799
See application file for complete search history.

(56) References Cited

U.S. PATENT DOCUMENTS

| | | | |
|---|---|---|---|
| 6,358,338 B1 | 3/2002 | Guelton et al. | |
| 7,687,152 B2 * | 3/2010 | Ikematsu | ................ C22C 38/02 |
| | | | 148/533 |
| 9,611,527 B2 * | 4/2017 | Meurer | ..................... C23C 2/02 |
| 2008/0083477 A1 | 4/2008 | Drillet et al. | |
| 2009/0053556 A1 | 2/2009 | Sohn et al. | |
| 2009/0074605 A1 | 3/2009 | Kim et al. | |

(Continued)

FOREIGN PATENT DOCUMENTS

| | | |
|---|---|---|
| CN | 101346480 A | 1/2009 |
| CN | 101760712 A | 6/2010 |

(Continued)

OTHER PUBLICATIONS

JP 2004323944 A, Nov. 2004, Eng. Ab.*
Extended European Search Report issued in corresponding European Patent Application No. 13864152.7, dated Mar. 14, 2016.
International Search Report issued in corresponding International Patent Application No. PCT/KR2013/011900, dated Apr. 7, 2014; 4 pages with English translation.

(Continued)

Primary Examiner — Satya B Sastri
(74) Attorney, Agent, or Firm — McDermott Will & Emery LLP

(57) ABSTRACT

There are provided a method for manufacturing a high manganese hot-dip galvanized steel sheet having superior coatability and ultra-high strength, and a high manganese hot-dip galvanized steel sheet manufactured by the method. The method includes: cold rolling a hot-rolled steel sheet to form a cold-rolled steel sheet, the hot-rolled steel sheet including, by wt %, C: 0.3% to 1%, Mn: 8% to 25%, Si: 0.1% to 3%, Al: 0.01% to 8%, Cr: 0.1% to 2%, Ti: 0.01% to 0.2%, B: 0.0005% to 0.01%, Ni: 0.01% to 2%, Sn: 0.06% to 0.2%, and a balance of Fe and inevitable impurities; heating the cold-rolled steel sheet; cooling the heated steel sheet to, or maintaining the heated steel sheet; and performing a hot-dip galvanizing process on the cooled or temperature-maintained steel sheet by dipping the cooled or temperature-maintained steel sheet into a hot-dip galvanizing bath.

4 Claims, No Drawings

(56) References Cited

U.S. PATENT DOCUMENTS

| | | | |
|---|---|---|---|
| 2009/0202382 A1 | 8/2009 | Kim et al. | |
| 2011/0017361 A1* | 1/2011 | Meurer | C23C 2/02 |
| | | | 148/531 |
| 2011/0094336 A1* | 4/2011 | Spitzer | C21C 5/5264 |
| | | | 75/10.66 |
| 2012/0045358 A1* | 2/2012 | Lee | C21D 6/005 |
| | | | 420/74 |
| 2012/0125491 A1 | 5/2012 | Meurer et al. | |
| 2013/0000796 A1* | 1/2013 | Takeda | C21D 6/00 |
| | | | 148/533 |

FOREIGN PATENT DOCUMENTS

| | | | |
|---|---|---|---|
| CN | 101952474 A | | 1/2011 |
| CN | 102021482 A | | 4/2011 |
| CN | 102421928 A | | 4/2012 |
| JP | 04-259325 A | | 9/1992 |
| JP | 2001-049348 A | | 2/2001 |
| JP | 2004323944 A | * | 11/2004 |
| JP | 2008-517157 A | | 5/2008 |
| JP | 2009-521596 A | | 6/2009 |
| JP | 2009-545676 A | | 12/2009 |
| JP | 2011-514436 A | | 5/2011 |
| JP | 2012-524839 A | | 10/2012 |
| KR | 10-0742833 B1 | | 7/2007 |
| KR | 10-2010-0064503 A | | 6/2010 |
| KR | 10-2010-0073819 A | | 7/2010 |
| KR | 10-2011-0087800 A | | 8/2011 |
| KR | 10-2012-0074145 A | | 7/2012 |
| WO | 93/13233 A1 | | 7/1993 |
| WO | 99/01585 A1 | | 1/1999 |
| WO | 02/101109 A1 | | 12/2002 |
| WO | 2009/084793 A1 | | 7/2009 |
| WO | WO 2010122097 A1 * | 10/2010 | ............... C23C 2/02 |

OTHER PUBLICATIONS

Notice of First Office Action issued in corresponding Chinese Patent Application No. 2013-80067419.2, dated May 24, 2016; with English translation.

Office Action issued in corresponding Japanese Patent Application No. 2015-549262, dated Aug. 9, 2016.

\* cited by examiner

METHOD FOR MANUFACTURING HIGH MANGANESE HOT-DIP GALVANIZED STEEL SHEET WITH EXCELLENT COATABILITY AND ULTRA-HIGH STRENGTH, AND HIGH MANGANESE HOT-DIP GALVANIZED STEEL SHEET MANUFACTURED BY SAID METHOD

RELATED APPLICATIONS

This application is the U.S. National Phase under 35 U.S.C. § 371 of International Patent Application No. PCT/KR2013/011900, filed on Dec. 19, 2013, which in turn claims the benefit of Korean Patent Application No. 10-2012-0151539, filed on Dec. 21, 2012, the disclosures of which Applications are incorporated by reference herein.

TECHNICAL FIELD

The present disclosure relates to a method for manufacturing a high manganese hot-dip galvanized steel sheet having superior coatability and ultra-high strength, and a high manganese hot-dip galvanized steel sheet manufactured by the method.

BACKGROUND ART

Owing to the high corrosion resistance, weldability, and coatability thereof, hot-dip galvanized steel sheets are widely used as automotive steel sheets. Automobile panels and structural members are required to have high strength for the purposes of weight reduction, improvements in fuel efficiency, and passenger safety, and thus many kinds of high-strength automotive steels have been developed.

Although steels for automobiles are required to have high formability for press-forming or roll-forming processes in addition to having high strength, most kinds of steel do not satisfy such requirements, and thus different kinds of steel are used according to individual applications. For example, dual-phase steel (DP steel in which relatively hard martensite formed by phase transformation is finely dispersed within a matrix of ferrite) having uniform ductility and deep drawing properties as well as a high degree of strength, owing to a low yield strength ratio and a high strain hardening rate, is commonly used in applications requiring press-forming processes, and martensite single-phase steel having a high degree of strength and a degree of balance between strength and bendability is used in applications requiring roll-forming processes.

Therefore, a large amount of research has recently been conducted into steel having a high degree of formability for both press-forming and roll-forming processes as well as having a high degree of strength. As a result, as disclosed in Patent Documents 1 to 4, austenitic high manganese steel has been proposed, in which manganese is included in an amount of 5% to 35% to induce the formation of twins during plastic deformation and to thus obtain a high degree of strength and a markedly improved degree of ductility.

However, since there is a limit to increasing the tensile strength of austenitic high manganese steel to 1200 MPa or greater, it is difficult to manufacture ultra-high-strength steel from austenitic high manganese steel. That is, alloying elements such as manganese (Mn), silicon (Si), chromium (Cr), or vanadium (V) have to be additionally added in order to obtain a degree of strength of 1200 MPa or greater.

However, if alloying elements are added to such high manganese steel, the hot-dip galvanization properties of the high manganese steel are further deteriorated. Specifically, when a hot-dip galvanized steel sheet is produced by coating a high manganese steel sheet through a hot-dip galvanizing process, an annealing process is usually performed under a nitrogen atmosphere including hydrogen so as to obtain the necessary material properties and surface activation (reduction) properties. In this case, the atmosphere serves as a reducing atmosphere for iron (Fe) in the high manganese steel sheet and an oxidizing atmosphere for easily oxidizable elements of the high manganese steel such as manganese (Mn), silicon (Si), aluminum (Al), or chromium (Cr). Therefore, if a high manganese steel sheet in which alloying elements such as aluminum (Al) and silicon (Si), as well as manganese (Mn), are included in large amounts is processed through a recrystallization annealing process under such an atmosphere, the alloying elements may be selectively oxidized (selective oxidation) by moisture or oxygen contained in small amounts in the atmosphere, and thus oxides such as oxides of manganese (Mn), aluminum (Al), or silicon may be formed on the surface of the high manganese steel sheet (base steel sheet to be coated). Therefore, when the high manganese steel sheet is coated, the high manganese steel sheet may not be properly coated, or a coating layer formed on the high manganese steel sheet may be removed in a later machining process.

That is, if alloying elements are added to high manganese steel sheets, it may be difficult to coat the high manganese steel sheets under general processing conditions. Furthermore, the addition of relatively expensive alloying elements may increase manufacturing costs.

RELATED ART DOCUMENTS (Patent Document 1) Japanese Patent Application Laid-open Publication No. H4-259325
(Patent Document 2) International Patent Publication No. WO93/013233
(Patent Document 3) International Patent Publication No. WO99/001585
(Patent Document 4) International Patent Publication No. WO02/101109

DISCLOSURE

Technical Problem

Aspects of the present disclosure may provide a method for manufacturing a high manganese hot-dip galvanized steel sheet having superior coatability without coating defects such as coating failures or separation, as well as having ultra-high-strength without the need for relatively expensive alloying elements or perform a high-temperature annealing process, and a high manganese hot-dip galvanized steel sheet manufactured by the method.

Technical Solution

According to an aspect of the present disclosure, a method for manufacturing a high manganese hot-dip galvanized steel sheet may include: cold rolling a hot-rolled steel sheet at a reduction ratio of 30% to 60% to form a cold-rolled steel sheet, the hot-rolled steel sheet including, by wt %, carbon (C): 0.3% to 1%, manganese (Mn): 8% to 25%, silicon (Si): 0.1% to 3%, aluminum (Al): 0.01% to 8%, chromium (Cr): 0.1% to 2%, titanium (Ti): 0.01% to 0.2%, boron (B): 0.0005% to 0.01%, nickel (Ni): 0.01% to 2%, tin (Sn): 0.06% to 0.2%, and a balance of iron (Fe) and inevitable impurities; heating the cold-rolled steel sheet under conditions of a dew point temperature ranging from −30° C. to −80° C. and a heating temperature ranging from 450° C. to 650° C.; cooling the heated steel sheet to, or maintaining the heated steel sheet at, a temperature within a range of 450° C. to 500° C.; and performing a hot-dip galvanizing process on the cooled or temperature-maintained steel sheet by dipping the cooled or temperature-maintained steel sheet into a hot-dip galvanizing bath containing aluminum (Al) in an amount of 0.13 wt % to 0.25 wt % and maintained at a temperature of 450° C. to 500° C.

According to another aspect of the present disclosure, a high manganese hot-dip galvanized steel sheet may include, by wt %, carbon (C): 0.3% to 1%, manganese (Mn): 8% to 25%, silicon (Si): 0.1% to 3%, aluminum (Al): 0.01% to 8%, chromium (Cr): 0.1% to 2%, titanium (Ti): 0.01% to 0.2%, boron (B): 0.0005% to 0.01%, nickel (Ni): 0.01% to 2%, tin (Sn): 0.06% to 0.2%, and a balance of iron (Fe) and inevitable impurities, wherein particle-shaped oxides may be formed on the steel sheet to a thickness of 10 µm or less (excluding 0 µm) before the steel sheet is hot-dip galvanized, and non-coated regions of the high manganese hot-dip galvanized steel sheet may have an average diameter of 1 mm or less (including 0 mm).

Advantageous Effects

According to the present disclosure, the surface concentration of alloying elements and the formation of an oxide film may be prevented through a low-temperature heat treatment process without having to additionally add relatively expensive alloying elements or perform a high-temperature annealing process, and thus a high manganese hot-dip galvanized steel sheet having an ultra-high strength of 1200 MPa or greater and a high degree of coatability may be provided.

Best Mode

The inventors have conducted research into mechanical properties of parts manufactured through a roll forming process, such as bumper beams, seal sides, seat rails, or crashworthy members. As a result, the inventors have found that ductility is not greatly required for such parts even in the case that a high degree of strength and a high degree of balance between strength and bendability are required. That is, the inventors have found that mechanical members of automobiles having a tensile strength of 1200 MPa or greater and an elongation of 7% or greater do not crack even in the case that the mechanical members are bent during a roll-forming process, and ultra-high-strength martensitic steel may satisfy such material properties. However, ultra-high-strength martensitic steel has to be rapidly cooled to a martensite start point Ms or lower after an annealing process so as to induce a transformation of microstructures into martensite. In addition, since it is difficult to obtain an elongation of 7% or higher only through a martensite single phase even in the case that a tensile strength of 1200 MPa or higher is guaranteed, a high-temperature annealing process up to a temperature of 800° C. or higher is necessary for obtaining a mixed microstructure in which ferrite or bainite is distributed locally within martensite.

If ultra-high-strength martensitic steel is coated under general coating conditions, coating failures or coating separation may occur due to the concentration (surface concentration) of alloying elements and the formation of film-shaped oxides on the surface of the ultra-high-strength martensitic steel during a high-temperature annealing process. Thus, pre-processes such as an internal oxidizing process, a nickel (Ni) pre-coating process, or two annealing processes are performed before a coating process.

However, the inventors found that since single-phase high manganese austenitic steel has uniform ductility and a high strain hardening rate, the material properties necessary for the roll-forming processes can be obtained even if single-phase high manganese austenitic steel is cold-rolled at a general reduction ratio. In addition, the inventors found that although a high-temperature annealing process for obtaining the necessary material properties is not performed before a coating process, coatability and a high degree of strength can be obtained by performing only a heat treatment process at a minimal temperature ranging from a coating bath temperature to a recrystallization temperature. Based on this knowledge, the inventors have invented the present invention.

Hereinafter, a manufacturing method of the present disclosure will be described. First, an explanation will be given of how alloying elements and the contents thereof are determined. In the following description, % refers to wt % unless otherwise specified.

Carbon (C): 0.3% to 1%

Carbon (C) stabilizes austenite, and as the content of carbon (C) increases, this effect may be increased. Thus, it may be preferable that the content of carbon (C) be 0.3% or more to obtain this effect. However, if the content of carbon (C) is greater than 1%, workability deteriorates because the stability of austenite markedly increases and thus deformation behavior occurs by slippage. Therefore, it may be preferable that the content of carbon (C) be within a range of 0.3% to 1%.

Manganese (Mn): 8% to 25%

Manganese (Mn) induces the formation of twins in the process of plastic deformation by stabilizing austenite, thereby increasing strength and markedly improving ductility. That is, manganese (Mn) is an essential element of high manganese steel. The content of manganese (Mn) for obtaining the above-mentioned effects may be at least 8% or more. However, if the content of manganese (Mn) exceeds 25%, high-temperature ductility deteriorates to cause the formation of cracks in a casting process, and oxidation occurs steeply at a high temperature in a reheating process performed as a preliminary process for a hot rolling process, thereby deteriorating the surface quality of products. Furthermore, surface oxidation (selective oxidation) deteriorating coatability may occur during an annealing process performed before a hot-dip galvanizing process, and manufacturing costs may be increased due to a large amount of manganese (Mn). Therefore, it may be preferable that the content of manganese (Mn) be within a range of 8% to 25%.

Silicon (Si): 0.1% to 3%

If silicon (Si) is only added to a steel sheet, silicon (Si) is concentrated to form a dense Si oxide film on the surface of the steel sheet during an annealing process before a hot-dip galvanizing process, thereby deteriorating the coatability of the steel sheet in the hot-dip galvanizing process. Therefore, the addition of only silicon (Si) is not favored. However, if silicon (Si) is added together with manganese (Mn) according to the present disclosure, the formation of a Si oxide film is blocked by manganese (Mn), and thus Si oxides are formed in the shape of particles. In addition, the thickness of Mn oxides is decreased. The content of silicon (Si) may be adjusted to be equal to or less than ⅕ the content of manganese (Mn) (Si/Mn≤0.2) in order to obtain the above-described effects. That is, if the content of silicon (Si) is greater than the range, wettability may deteriorate in a hot-dip galvanizing process because of the formation of Si oxides and Mn oxides, thereby causing coating failures and coating separation. In addition, if the content of silicon (Si) in a high manganese steel sheet is 3% or more, the ductility of the high manganese steel sheet may be markedly decreased. Therefore, the upper limit of the silicon (Si) content may be set to be 3%. Conversely, if the content of silicon (Si) is less than 0.1%, the effect of strength enhancement may not be easily obtained. Thus, the lower limit of the silicon (Si) content may be set to be 0.1%.

Aluminum (Al): 0.01% to 8%

Aluminum (Al) is usually added as a deoxidizer. However, in the present disclosure, aluminum (Al) is added to a high manganese steel sheet so as to prevent delayed fracture. Although aluminum (Al) stabilizes ferrite, aluminum (Al) increases stacking fault energy on slip planes, thereby suppressing the formation of ε-martensite and improving ductility and resistance against delayed facture. In addition, since aluminum (Al) suppresses the formation of ε-martensite even in the case that the content of manganese (Mn) is low, aluminum (Al) is useful for minimizing the content of manganese (Mn). Preferably, the content of aluminum (Al) in a high manganese steel sheet may be 1% or more for obtaining the above-mentioned effects. However, if the content of aluminum (Al) in a high manganese steel sheet is greater than 8%, the ductility of the high manganese steel sheet may be deteriorated because the formation of twins may be suppressed, and continuous casting properties of the high manganese steel sheet may also be deteriorated. Moreover, since aluminum (Al) is easily oxidized, aluminum (Al) may be oxidized on the surface of the high manganese steel sheet during an annealing process before a hot-dip galvanizing process, and thus the high manganese steel sheet may not be easily wetted with molten zinc. Therefore, the upper limit of the content of aluminum (Al) may be set to be 8%.

Chromium (Cr): 0.1% to 2%

Like silicon (Si), chromium (Cr) forms a corrosion-preventing passive film in the air. In addition, chromium (Cr) prevents decarbonization of steel during a high-temperature hot rolling process, thereby suppressing the formation of α'-martensite on the surface of steel and improving the formability of steel. To this end, it may be preferable that the content of chromium (Cr) be within a range of 0.1 wt % or more. However, if the content of chromium (Cr) stabilizing ferrite is greater than 2%, the formation of α'-martensite is facilitated, thereby lowering the ductility of steel. In addition, chromium (Cr) forms Cr oxides just beneath the surface of steel, thereby preventing the surface concentration and oxidation of manganese (Mn), silicon (Si), and aluminum (Al), all of which have a negative effect on coatability. However, if the chromium (Cr) content is excessive, a thick film of composite oxides mainly containing Cr oxides is formed, thereby deteriorating wettability with molten zinc and causing coating failures and separation. Therefore, the upper limit of the chromium content (Cr) may be set to be 2%.

Titanium (Ti): 0.01% to 0.2%

Titanium (Ti) dissolves in columnar grain boundaries and increases the melting points of aluminum (Al)-concentrated low melting compounds, thereby preventing the formation of a liquid film at 1300° C. or lower. In addition, since titanium (Ti) has high affinity to nitrogen, coarse aluminum nitride (AlN) which embrittles columnar grain boundaries is precipitated using titanium (Ti) as precipitation nuclei, and thus columnar grain boundaries are strengthened. However, if the content of titanium (Ti) is less than 0.01%, these effects are not obtained, and if the content of titanium (Ti) is greater than 0.2%, excessive titanium (Ti) segregates at grain boundaries and embrittles the grain boundaries. Therefore, it may be preferable that the content of titanium (Ti) be within a range of 0.01% to 0.2%.

Boron (B): 0.0005% to 0.01%

Boron (B) dissolves in columnar grain boundaries at a temperature of 1000° C. or higher, thereby suppressing the formation and movement of empty pores and strengthening the columnar grain boundaries. However, if the content of boron (B) is less than 0.0005%, these effects are not obtained. If the content of boron (B) is greater than 0.01%, carbides and nitrides functioning as nuclei for precipitating aluminum nitride are formed in large amounts, thereby causing the formation of coarse aluminum nitride and embrittling grain boundaries. In addition, if the content of boron (B) is greater than 0.01%, boron oxides are formed by surface concentration and oxidation in an annealing process before a coating process. Therefore, the content of boron (B) is limited to a range of 0.0005% to 0.01%.

Nickel (Ni): 0.01% to 2%

Nickel (Ni) increases the stability of austenite and thus suppresses the formation of α'-martensite, which deteriorates formability. Therefore, if nickel (Ni) is added to high manganese steel having austenite at room temperature, the formation of twins is facilitated, and thus the strength and ductility of the high manganese steel for machining processes are improved. In terms of coating, since nickel (Ni) is noble metal, nickel (Ni) added to steel does not oxidize by itself but precipitates on the surface of the steel at high temperatures, thereby suppressing the diffusion (surface diffusion) of easily oxidizable elements such as aluminum (Al), manganese (Mn), or silicon (Si) to the surface of the steel, thereby decreasing the thickness of surface oxides and varying the composition of the steel to improve the wettability of the steel with molten zinc. When the content of nickel (Ni) is at least 0.01% or greater, these effects are obtained. However, if the content of nickel (Ni) increases, internal oxidation rapidly occurs along grain boundaries to cause the formation of cracks during a hot rolling process, and manufacturing costs are increased. Therefore, the upper limit of the content of nickel (Ni) is set to be 2%.

Tin (Sn): 0.06% to 0.2%

Since tin (Sn) is noble metal, tin (Sn) added to steel does not form an oxide film by itself at high temperature. However, in an annealing process performed before a hot-dip galvanizing process, tin (Sn) precipitates on the surface of the steel and thus suppresses the diffusion of easily oxidizable elements such as aluminum (Al), silicon (Si), or manganese (Mn) to the surface of the steel. As a result, tin (Sn) prevents the formation of oxides on the surface of steel and improves the coatability of steel. However, if the content of tin (Sn) is 0.06% or less, these effects are surely obtained. Although the effect of suppressing the formation of selective oxides is increased as the content of tin (Sn) is increased, if the content of tin (Sn) is 0.2% or more, hot shortness occurs and properties for hot rolling processes are deteriorated. Therefore, the upper limit of the content of tin (Sn) is set to be 0.2%.

A hot-rolled steel sheet having the above-described alloying elements and element contents is prepared, and a cold rolling process is performed on the hot-rolled steel sheet to obtain a cold-rolled steel sheet. Before the hot-rolled steel sheet is cold rolled, a pickling process may be performed on the hot-rolled steel sheet to remove contaminants or scale from the hot-rolled steel sheet. It may be preferable that the cold rolling process be performed at a reduction ratio of 30% to 60%. According to research conducted by the inventors, when a high manganese steel sheet including large amounts of aluminum (Al) and silicon (Si) as well as a large amount of manganese (Mn) is processed through a cold rolling process, properties of the high manganese steel sheet vary according to the reduction ratio of the cold rolling process. However, since the high manganese steel of the present disclosure has a high strain hardening rate, the upper limit of the reduction ratio of a cold rolling process for the high manganese steel may be set to be about 60%, and the total elongation of the high manganese steel at the reduction ratio is 7% or more. Therefore, material properties required for a roll forming process may be ensured without having to add additional alloying elements or perform an additional heat treatment process. In addition, the reduction ratio is set to be at least 30% or more to obtain a tensile strength of 1200 MPa and an elongation of 7%, which are required for automotive mechanical members in a roll forming process. Therefore, it may be preferable that the reduction ratio of the cold rolling process be within a range of 30% to 60%. More preferably, the reduction ratio may be set to be within a range of 30% to 45%, and even more preferably within a range of 30% to 37%, so as to obtain a higher degree of workability.

Thereafter, the cold-rolled steel sheet obtained through the cold rolling process is heated to a temperature (heating temperature) of 450° C. to 650° C. under an atmosphere having a dew point temperature ranging from −30° C. to −80° C. During the heating process, if the dew point temperature is higher than −30° C., the atmosphere substantially functions as an oxidizing atmosphere inducing the formation of internal oxides and a thick surface oxide film, thereby causing coating failures and separation. Conversely, if the dew point temperature is lower than −30° C., the atmosphere functions as a reducing atmosphere preventing alloying elements such as manganese (Mn), aluminum (Al), or silicon (Si) from diffusing to the surface of the cold-rolled steel sheet and forming oxides. Particularly in the case of high manganese steel, the concentration of manganese (Mn) on the surface of the high manganese steel is more effectively prevented as the dew point temperature of a heating atmosphere is lowered. However, many refining apparatuses may be necessary for maintaining the dew point temperature of the heating atmosphere at a level lower than −80° C. by removing oxygen or moisture from the heating atmosphere (gas). Therefore, it may be preferable that the dew point temperature be within a range of −30° C. to −80° C.

For example, to coat an ultra-high-strength high manganese steel sheet through a hot-dip galvanizing process under general coating conditions, a high-temperature annealing process having a process temperature of 705° C. or higher is necessary before the hot-dip galvanizing process. In this case, a thick surface oxide film may be formed because of the surface concentration and oxidation of alloying elements such as manganese (Mn), aluminum (Al), or silicon (Si), thereby deteriorating the wettability of the ultra-high-strength high manganese steel sheet with molten zinc in the hot-dip galvanizing process and causing coating failures and separation. However, according to research conducted by the inventors, coating failures and separation occur if an ultra-high-strength high manganese steel sheet is heat treated at a high temperature such as in a general annealing process, but coating failures or separation do not occur if an ultra-high-strength high manganese steel sheet is heat treated at a relatively low temperature. In more detail, if the cold-rolled steel sheet is heated to a temperature higher than 650° C., the surface concentration of alloying elements is increased to result in the formation of a thick oxide film on the surface of the cold-rolled steel sheet as well as coating failures and separation, and thus the cold-rolled steel sheet may lose its ultra-high-strength properties because the tensile strength and yield strength of the cold-rolled steel sheet are markedly decreased. However, if the cold-rolled steel sheet is heated to 650° C. or lower, the surface concentration of easily oxidizable alloying elements is decreased, and thus surface oxides are formed in the shape of discontinuous particles to a thickness of 10 μm or less, thereby preventing coating failures and separation. In addition, the cold-rolled steel sheet may have a tensile strength of 1200 MPa or greater and an elongation of 7% or greater. That is, the cold-rolled steel sheet may have superior properties. As described above, according to the present disclosure, the heating temperature is set to be lower than the heating temperature range of general annealing processes, and as the heating temperature is lowered, further effects may be obtained. If the heating temperature is lower than 450° C., it may be predicted that the coatability of the cold-rolled steel sheet will be improved because surface oxides will be formed in the shape of particles to a very thin thickness. However, since the temperature (steel sheet dipping temperature) of the heated cold-rolled steel sheet is lower than the temperature of a coating bath, the wettability and reactivity of the steel sheet with molten zinc may be decreased to cause coating failures, or an inhibition layer may be insufficiently formed, causing coating separation. Therefore, it may be preferable that the heating temperature be within a range of 450° C. to 650° C. More preferably, the heating temperature may be set to be within a range of 450° C. to 600° C., and even more preferably within a range of 450° C. to 550° C., so as to further improve the strength and coatability of the steel sheet.

Thereafter, the heated steel sheet is cooled to or maintained at a temperature within a range of 450° C. to 500° C. The cooling or temperature-maintaining process is for improving the wettability of the steel sheet during a coating process. If the temperature of the steel sheet is lower than 450° C. before the steel sheet is dipped into a coating bath, that is, if the temperature of the steel sheet is lower than the temperature of the coating bath, the wettability and reactivity of the steel sheet with molten zinc may be decreased to cause coating failures, or an inhibition layer may be insufficiently formed to cause coating separation. Conversely, if the temperature of the steel sheet is higher than 500° C., an excessive amount of iron (Fe) may melt and come out of the steel sheet and react with zinc (Zn) or aluminum (Al) contained in the coating bath, thereby forming Fe—Zn-based bottom dross or Fe—Al-based floating dross and deteriorating the surface appearance of the steel sheet due to the inclusion of such dross in a coating layer.

Thereafter, the steel sheet cooled to or maintained at the temperature range is dipped into a hot-dip galvanizing bath containing aluminum (Al) in an amount of 0.13 wt % to 0.25 wt % and maintained at a temperature of 450° C. to 500° C. The aluminum (Al) contained in the hot-dip galvanizing bath first reacts with the steel sheet when the steel sheet is dipped in the hot-dip galvanizing bath after being heated. This reduces an oxide film formed on the surface of the steel sheet and forms a Fe—Mn—Al—Zn film as a ductile inhibition layer suppressing the growth of a frail Zn—Fe intermetallic compound. It may be favorable that the content of aluminum (Al) in the hot-dip galvanizing bath be relatively high. However, if the content of aluminum (Al) in the hot-dip galvanizing bath is greater than 0.25%, an Fe—Al compound may be easily formed as floating dross, and a stream pattern may be formed on the steel sheet due to a coating layer flowing down. Therefore, it may be preferable that the content of aluminum (Al) in the hot-dip galvanizing bath be 0.25% or less. The concentration and oxidation of alloying elements do not occur on the surface of ultra-high-strength high manganese steel if the ultra high strength high manganese steel is processed through a low-temperature heat treatment process. Therefore, in the case that the content of aluminum (Al) in the hot-dip galvanizing bath is 0.13%, which is lower than the content of aluminum (Al) in a general coating bath, an Fe—Mn—Al—Zn film may be formed as a ductile interfacial inhibition layer. Thus, it may be preferable that the content of aluminum (Al) in the hot-dip galvanizing bath be within a range of 0.13 wt % to 0.25 wt %. However, if the content of aluminum (Al) in the hot-dip galvanizing bath is less than 0.13%, a non-uniform inhibition layer may be formed and cause coating failures or separation.

If the temperature of the hot-dip galvanizing bath is lower than 450° C., the fluidity of molten zinc contained in the hot-dip galvanizing bath may be decreased considerably, causing surface defects such as a stream pattern. Conversely, if the temperature of the hot-dip galvanizing bath is greater than 500° C., the molten zinc and aluminum contained in the hot-dip galvanizing bath may react with oxygen to form an excessive amount of Zn—Al oxide (upper dross), and thus surface defects may form on a coating layer of the steel sheet due to the attachment of the Zn—Al oxide to the coating layer. Therefore, it may be preferable that the temperature of the hot-dip galvanizing bath be within a range of 450° C. to 500° C.

As described above, according to the method for manufacturing a high manganese hot-dip galvanized steel sheet of the present disclosure, the surface concentration of alloying elements and the formation of an oxide film may be prevented through a low-temperature heat treatment process without having to additionally add relatively expensive alloying elements or perform a high-temperature annealing process, and the high manganese hot-dip galvanized steel sheet may have an ultra-high strength of 1200 MPa or more, an elongation of 7% or more, and superior coatability.

For example, the present disclosure may provide a high manganese hot-dip galvanized steel sheet having the above-described composition including, by wt %, carbon (C): 0.3% to 1%, manganese (Mn): 8% to 25%, silicon (Si): 0.1% to 3%, aluminum (Al): 0.01% to 8%, chromium (Cr): 0.1% to 2%, titanium (Ti): 0.01% to 0.2%, boron (B): 0.0005% to 0.01%, nickel (Ni): 0.01% to 2%, tin (Sn): 0.06% to 0.2%, and a balance of iron (Fe) and inevitable impurities, wherein particle-shaped oxides may form on the steel sheet to a thickness of 10 μm or less (excluding 0 μm) before the steel sheet is hot-dip galvanized, and the average diameter of non-coated regions of the high manganese hot-dip galvanized steel sheet may be 1 mm or less. The average diameter of non-coated regions may preferably be 0.5 mm or less, and more preferably 0.3 mm or less. Most preferably, non-coated regions may not be formed. As described above, if particle-shaped surface oxides are formed on the steel sheet to a thin thickness, coating failures and separation may surely be prevented compared to a steel sheet having surface oxides in the form of a thick film, and thus the coatability of the steel sheet may be improved. As the thickness of surface oxides is reduced, coatability improves. Thus, the lower limit of the thickness of surface oxides is not set. In addition, the high manganese hot-dip galvanized steel sheet may have a tensile strength of 1200 MPa and an elongation of 7% and thus may be utilized for manufacturing mechanical members of automobiles.

MODE FOR INVENTION

Hereinafter, the present disclosure will be described more specifically through examples. However, the following examples are for illustrative purposes only and are not intended to limit the scope of the present invention.

EXAMPLE 1

High manganese steel including 0.55% C, 15% Mn, 0.1% Si, 1.9% Al, 0.28% Cr, 0.09% Ti, 0.001% B, 0.25% Ni, and 0.06% Sn was continuously cast to form a slab, and the slab was heated to 1100° C., finish hot rolled at 950° C., and coiled at 450° C. to form a hot-rolled steel sheet having a thickness of 2.81 mm. The hot-rolled steel sheet was pickled with a 15% aqueous hydrochloric acid solution, and cold-rolled steel sheets were prepared by performing a cold rolling process on the hot-rolled steel at different reduction ratios as illustrated in Table 1 below. Tensile test samples were prepared using the cold-rolled steel sheets prepared as described above according to JIS 5, and the yield strength, tensile strength, and elongation of the samples were measured as illustrated in Table 1 below.

TABLE 1

| No. | Reduction ratio (%) | Thickness of cold-rolled steel sheet (mm) | Yield strength (MPa) | Tensile strength (MPa) | Total elongation (%) |
|---|---|---|---|---|---|
| *CS 1 | 0 | 2.81 | 454.3 | 836.0 | 57.0 |
| CS 2 | 8.5 | 2.57 | 605.3 | 889.4 | 45.2 |
| CS 3 | 13.5 | 2.43 | 742.8 | 964.3 | 33.7 |
| CS 4 | 20 | 2.25 | 776.5 | 1002.3 | 28.7 |
| CS 5 | 24 | 2.14 | 887.9 | 1114.6 | 20.6 |
| **IS 1 | 30 | 1.97 | 1017.8 | 1248.9 | 13.8 |
| IS 2 | 34 | 1.85 | 1074.6 | 1308.6 | 11.2 |
| IS 3 | 37 | 1.77 | 1103.8 | 1383.5 | 10.4 |
| IS 4 | 40 | 1.69 | 1134.7 | 1419.7 | 8.5 |
| IS 5 | 42 | 1.63 | 1179.5 | 1460.7 | 8.3 |
| IS 6 | 46 | 1.52 | 1234.4 | 1521.4 | 7.7 |
| IS 7 | 51 | 1.38 | 1240.2 | 1536.9 | 7.6 |

*CS: Comparative Sample,
**IS: Inventive Sample

As illustrated in Table 1 above, each of Inventive Samples 1 to 7 satisfying the reduction ratio range of the present disclosure had a tensile strength of 1200 MPa or more and an elongation of 7% or more owing to an austenite single phase and a high strain hardening rate thereof.

However, Comparative Samples 1 to 5 not satisfying the reduction ratio range of the present disclosure do not have ultra-high strength due to a low strain hardening rate.

EXAMPLE 2

Cold-rolled steel sheets prepared at a reduction ratio of 51% in the same manner as Example 1 were processed through a heat treatment process under a reducing atmosphere containing 5% hydrogen and the balance of nitrogen, and having a dew point temperature of −40° C. The heat treatment process was performed for 40 seconds at different heating temperatures as illustrated in Table 2 below, and then the steel sheets were cooled to 480° C. and were dipped in a hot-dip galvanizing bath containing 0.23% aluminum (Al) and having a temperature of 450° C. for 5 seconds. Thereafter, the amount of coating material on each of the coated steel sheets was adjusted to be 60 g/m² by using an air knife. In this manner, hot-dip galvanized steel sheets were prepared. The thickness and shape of surface oxides formed on each of the hot-dip galvanized steel sheets were measured, and the coating quality of the hot-dip galvanized steel sheets was evaluated according to the following grades. The results of the measurement and evaluation are illustrated in Table 2 below. Tensile test samples were prepared using the hot-dip galvanized steel sheets according to JIS 5, and the yield strength, tensile strength, and elongation of the samples were measured as illustrated in Table 2 below.

The degrees of coating failures of the hot-dip galvanized steel sheets were evaluated by capturing images of coated surfaces after the hot-dip galvanizing process and measuring the sizes of non-coated regions, and the results of the evaluation were indicated by the grades explained below.

Grade 1: no non-coated regions
Grade 2: average diameter of non-coated regions less than 1 mm
Grade 3: average diameter of non-coated regions within a range of 1 mm to less than 2 mm
Grade 4: average diameter of non-coated regions within a range of 2 mm to less than 3 mm
Grade 5: average diameter of non-coated regions 3 mm or greater After performing a bending test on the hot-dip galvanized steel sheets using an overlay tester (OT), a taping test was performed on the outer sides of the bent portions of the hot-dip galvanized steel sheets to observe the separation of coating layers from the hot-dip galvanized steel sheets. The degree of separation of the coating layers was evaluated according to the following grades.

Grade 1: no separation
Grade 2: separation less than 5%
Grade 3: separation within a range of 5% to less than 10%
Grade 4: separation within a range of 10% to less than 30%
Grade 5: separation 30% or more recrystallization did not occur in Inventive Samples 8 to 12. Thus, Inventive Samples 8 to 12 had properties of ultra-high-strength steel: an ultra-high strength of 1200 MPa or greater and an elongation of 7% or more.

Although Comparative Sample 6 had superior mechanical properties, coating failures were observed because Comparative Sample 6 had a temperature lower than the temperature of the hot-dip galvanizing bath due to a significantly low heating temperature, and thus had low degrees of wettability and reactivity with molten zinc. In addition, an inhibition layer was poorly formed, and thus a coating layer was separated.

Surface oxides were formed in the form of thick films on Comparative Samples 7 to 11 due to a high-temperature annealing process. Thus, coating failures occurred or coating separation was observed in a later machining process. In addition, the tensile strength and yield strength of Comparative Samples 7 to 11 were very low. That is, Comparative Samples 7 to 11 lost their ultra-high-strength properties.

The invention claimed is:

1. A high manganese hot-dip galvanized steel sheet comprising, by wt %, carbon (C): 0.3% to 1%, manganese (Mn): 8% to 25%, silicon (Si): 0.1% to 3%, aluminum (Al): 0.01% to 8%, chromium (Cr): 0.1% to 2%, titanium (Ti): 0.01% to 0.2%, boron (B): 0.0005% to 0.01%, nickel (Ni): 0.01% to 2%, tin (Sn): 0.06% to 0.2%, and a balance of iron (Fe) and inevitable impurities, wherein discontinuous particle-shaped Si oxides of a thickness of 5 μm to 10 μm are formed on the steel sheet before the steel sheet is hot-dip galvanized, and non-galvanized regions of the high manganese hot-dip galvanized steel sheet have an average diameter of 1 mm or less, including 0 mm, and

TABLE 2

|  |  | Mechanical properties |  |  | Surface oxides |  | Coating quality | |
| --- | --- | --- | --- | --- | --- | --- | --- | --- |
|  |  |  |  |  |  |  | Coating | Adhesion of |
| No. | HT (° C.) | YS (MPa) | TS (MPa) | E (%) | T (μm) | Shape | failures (non 1 ↔ 5 high) | coating (good 1 ↔ 5 poor) |
| CS 6 | 400 | 1293.86 | 1497.61 | 8.34 | 5 | P | Grade 3 | Grade 3 |
| IS 8 | 450 | 1254.19 | 1445.09 | 10.65 | 5 | P | Grade 1 | Grade 1 |
| IS 9 | 500 | 1195.52 | 1377.25 | 11.23 | 5 | P | Grade 1 | Grade 1 |
| IS 10 | 550 | 1047.06 | 1325.54 | 13.94 | 7 | P | Grade 1 | Grade 1 |
| IS 11 | 600 | 1019.08 | 1228.63 | 16.95 | 7 | P | Grade 1 | Grade 1 |
| IS 12 | 650 | 1010.14 | 1205.24 | 20.35 | 10 | P | Grade 2 | Grade 1 |
| CS 7 | 700 | 669.21 | 997.54 | 37.79 | 30 | F | Grade 3 | Grade 4 |
| CS 8 | 720 | 617.66 | 963.5 | 42.09 | 30 | F | Grade 3 | Grade 4 |
| CS 9 | 750 | 567.83 | 933.79 | 49.3 | 50 | F | Grade 4 | Grade 5 |
| CS 10 | 780 | 549.41 | 917.26 | 48.53 | 70 | F | Grade 4 | Grade 5 |
| CS 11 | 800 | 530.6 | 907.55 | 55.27 | 70 | F | Grade 4 | Grade 5 |

CS: Comparative Sample,
IS: Inventive Sample,
HT: Heating Temperature,
YS: Yield Strength,
TS: Tensile Strength,
E: Elongation,
T: Thickness,
P: Particles,
F: Film As illustrated in Table 2, in Inventive Samples 8 to 12 satisfying conditions of the present disclosure such as the heating temperature range, a thin layer of particle-shaped surface oxides was formed owing to the low-temperature heat treatment, and thus surface defects such as coating failures and separation were not observed. In addition, wherein the high manganese hot-dip galvanized steel sheet has a tensile strength of 1200 MPa or greater and an elongation of 7% or greater.

2. The high manganese hot-dip galvanized steel sheet of claim 1, wherein the non-galvanized regions have an average diameter of 0.5 mm or less.

3. The high manganese hot-dip galvanized steel sheet of claim 1, wherein the non-galvanized regions have an average diameter of 0.3 mm or less.

4. A high manganese hot-dip galvanized steel sheet manufactured by a method comprising cold rolling a hot-rolled steel sheet at a reduction ratio of 30% to 60% to form a cold-rolled steel sheet; heating the cold-rolled steel sheet under conditions of a dew point temperature ranging from −30° C. to −80° C. and a heating temperature ranging from 450° C. to 650° C.; cooling the heated steel sheet to, or maintaining the heated steel sheet at, a temperature within a range of 450° C. to 500° C.; and performing a hot-dip galvanizing process on the cooled or temperature-maintained steel sheet by dipping the cooled or temperature-maintained steel sheet into a hot-dip galvanizing bath containing aluminum (Al) in an amount of 0.13 wt % to 0.25 wt % and maintained at a temperature of 450° C. to 500° C., wherein the high manganese hot-dip galvanized steel sheet comprises, by wt %, carbon (C): 0.3% to 1%,
manganese (Mn): 8% to 25%,
silicon (Si): 0.1% to 3%,
aluminum (Al): 0.01% to 8%,
chromium (Cr): 0.1% to 2%,
titanium (Ti): 0.01% to 0.2%,
boron (B): 0.0005% to 0.01%,
nickel (Ni): 0.01% to 2%,
tin (Sn): 0.06% to 0.2%, and
a balance of iron (Fe) and inevitable impurities,
wherein discontinuous particle-shaped Si oxides of a thickness of 5 μm to 10 μm are formed on the steel sheet before the steel sheet is hot-dip galvanized, and non-galvanized regions of the high manganese hot-dip galvanized steel sheet have an average diameter of 1 mm or less, including 0 mm, and
wherein the high manganese hot-dip galvanized steel sheet has a tensile strength of 1200 MPa or greater and an elongation of 7% or greater.

\* \* \* \* \*